Oct. 21, 1952     M. M. ROSTEN     2,615,029
METHOD OF RECOVERING GERM OIL
Filed Feb. 24, 1950
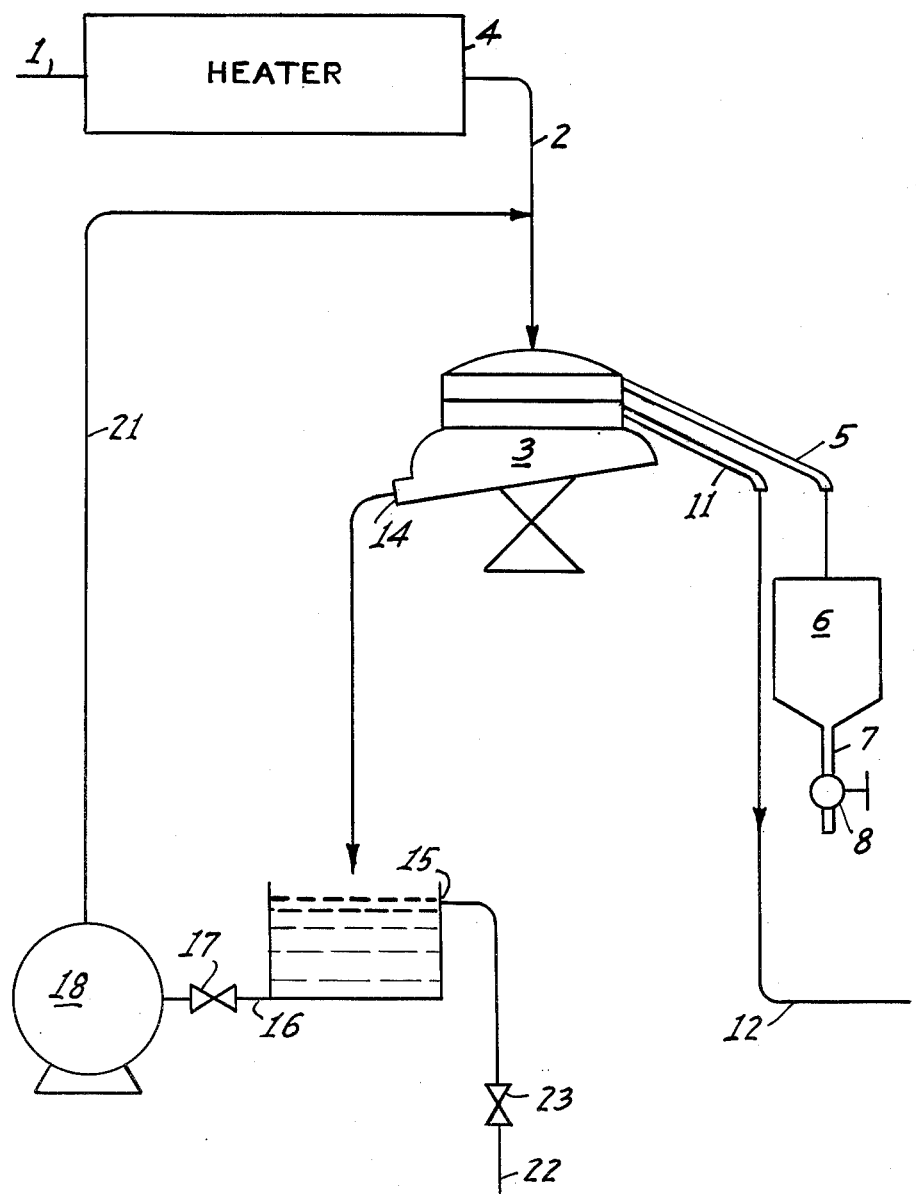
INVENTOR.
Maurice M. Rosten
BY Louis Burgess
Attorney Patented Oct. 21, 1952

2,615,029

UNITED STATES PATENT OFFICE 2,615,029

METHOD OF RECOVERING GERM OIL

Maurice M. Rosten, New York, N. Y., assignor to National Distillers Products Corp., a corporation of Virginia Application February 24, 1950, Serial No. 146,000

7 Claims. (Cl. 260—412)

This invention is a new and useful method of recovering germ oil from the slop produced in the ethyl or butyl alcohol fermentation and distillation of a cereal mash and will be fully understood from the following description read in conjunction with the drawing, which is a diagrammatic showing of apparatus in which the method may be carried into effect.

In the ordinary method for the production of alcohol by fermentation, a cereal mash is prepared which is then subjected to an alcoholic fermentation, and the beer so obtained is distilled to vaporize an aqueous alcohol which is condensed, leaving an aqueous residue of the distillation as bottoms. This is the so-called distillers' slops, which contains the unfermented residue of the mash, partly in solution and partly in suspension. The germ which is a constituent of the cereal contains several percent of oil. Based on the entire cereal corn, for example, contains about 3½% of oil, or approximately 2 lbs. per bushel. In any case this oil is inert with respect to fermentation and is therefore carried through the various stages of alcohol production. Where the slop is worked up for by-products, the oil will be present in the slop. If the thin slop is concentrated and dried, the oil is a constituent of the dry feed. It may be present to the extent of 8–15% of the total constituents (moisture-free basis) of the dry solubles. Due to the high protein and vitamin content, the dry solubles are used principally as poultry feed but the high fat content is undesirable since it fattens the hen and decreases egg output. It is therefore important to produce dry solubles of reduced fat content.

If the cereal used is corn, it is of course possible to reduce the oil present in the dry solubles by degermination of the corn used, but this involves several additional steps and adds substantially to the over-all cost of the operation while resulting in the recovery of only about half of the oil present.

In accordance with my invention distillers' slops, and preferably distillers' thin slop prepared by the screening or similar treatment of the bottoms from the fermentation and alcohol distillation of a cereal-containing mash, is introduced through pipe 1 into pipe 2, which discharges into the inlet of centrifuge 3. The feed to the centrifuge is preferably heated to a temperature of at least 150° F. in any suitable heater diagrammatically indicated by 4. In the event that the slop is taken directly from the beer still it will have been heated in the beer still to a temperature of approximately 212° F. and even allowing for the heat loss in the intermediate piping, will be delivered to the centrifuge at a temperature of from 180–190° F. In this case of course the use of the special heater diagrammatically indicated is unnecessary.

Centrifuge 3 is adapted to apply a force of at least 4,000 g's and preferably of at least 6,000 g's. In practice I have successfully employed a centrifuge, the bowl of which had an inside diameter of 18 inches, and which rotated at 6,000 R. P. M.

The centrifuge may be of the type which is adapted to produce two liquid cuts, the lighter of which is an emulsion of germ oil and water, and is derived from the inner radius of the rotating mass, while the other comprises the entire remainder of the feed. Inasmuch, however, as the feed normally contains suspended particles of a fineness such that they were not removed in the preliminary treatment, I find it advisable to employ a centrifuge adapted to yield three separate liquid cuts. The lighter of these is mainly an emulsion of corn oil and water derived from the inner radius of the rotating mass; the heavier of these is a slurry of solid particles in water derived from the periphery of the rotating mass, while the other comprises the entire remainder of the thin slop consisting of an aqueous solution of the soluble constituents of the original slop, containing considerably less suspended particles and containing only part of the oil originally present in the thin slop.

The slurry is continuously bled out of the centrifuge by means of adjustable orifices in the periphery of the bowl.

The lighter cut, i. e., the emulsion of germ oil and water, is passed from centrifuge 3 through discharge 5 into tank 6. In ordinary practice this emulsion will contain at least 15% by weight of oil. It may be withdrawn from the tank through pipe 7 controlled by valve 8 for utilization in any suitable way. Thus, for example, the emulsion may be resolved by further centrifuging or by extraction to recover the germ oil, and the crude germ oil so recovered may be refined and/or bleached for use industrially or as a foodstuff. At least 25%, and preferably at least 50% of the oil present in the feed to the centrifuge will be found in this cut. The intermediate cut, consisting of the thin slop containing less solids, is passed through discharge 11 and thence through pipe 12. The concentration of suspended solids in this cut should not run over 1%. In ordinary practice this cut will be further concentrated in a multiple effect evaporator and thence to solid consistency on a drum dryer, for sale as poultry feed, etc. Because of the reduced oil content, it is an ideal feed for poultry. The cut which carries mainly the insoluble particles in suspension is passed continuously through discharge 14 into tank 15. Of the suspended solids present in the feed at least half will be removed in this cut, which normally carries at least 10% of the total solids. For the purpose of insuring that a minimum of germ oil will be lost to the system in this cut, it may, if desired, be in part continuously withdrawn from tank 15 through pipe 16 controlled by valves 17 and recycled thence by pump 18, discharging into pipe 21 back into inlet 2 to centrifuge 3. The slurry may be withdrawn from tank 15, either continuously or intermittently, through pipe 22 controlled by valve 23.

As a practical example of the application of my invention, a thin slop containing 4.4% total solids, of which 1.6% was present as insoluble suspended solids and containing 0.63% oil, was fed through a centrifuge at the rate of 1200 gallons per hour. The total amount so fed was 1000 gallons. The bowl of this centrifuge had an inside diameter of 18" and was rotated at the rate of 6,000 R. P. M. The force to which the liquid was subjected in the centrifuge was approximately 6,000 g's. The centrifuge provided for the separation of the feed into three separate cuts. Of these the slurry containing the suspended particles amounted to 75 gallons and contained 12.7% total solids and .8% oil. The intermediate cut showed only 3.6% total solids, of which only 0.8% was present in suspension and contained 0.26% oil. The oil emulsion recovered consisted of 7 gallons containing about 50% of oil.

The foregoing description is for purposes of illustration and not of limitation and it is therefore my intention that the invention be limited only by the appended claims or their equivalent wherein I have endeavored to claim broadly all inherent novelty.

I claim:

1. Method of recovering germ oil from the slop produced by mashing cereal, the alcoholic fermentation of the mash so produced, thereby producing a beer and the distillation of said beer, thereby producing a distillate of alcohol and a bottoms of distillers' slop, which comprises subjecting such a slop to a centrifugal force of at least 4,000 g's, while at a temperature of at least 150° F. thereby producing a liquid phase enriched in oil and a residue of slop from which said oil was derived, and separately conducting away said liquid phase enriched in oil and said residue.

2. Process according to claim 1 which comprises subjecting said slop to a centrifugal force of at least 6,000 g's.

3. Method of recovering germ oil from the slop produced by mashing cereal, the alcoholic fermentation of the mash so produced, thereby producing a beer, and the distillation of said beer, thereby producing a distillate of alcohol and a distillers' slop, which comprises removing suspended solids from the said slop, thereby producing a thin slop, subjecting said thin slop to centrifugal force of at least 4,000 g's, while at a temperature of at least 150° F. thereby producing a liquid phase enriched in oil and a residue of slop from which said oil was derived, and separately conducting away said liquid phase enriched in oil and said residue.

4. Process according to claim 3 which comprises subjecting said thin slop to a centrifugal force of at least 6,000 g's.

5. Method of recovering germ oil from the slop produced by mashing cereal, the alcoholic fermentation of the mash so produced, thereby producing a beer and the distillation of said beer, thereby producing a distillate of alcohol and a distillers' slop, which comprises removing suspended solids from the said slop, thereby producing a thin slop, subjecting said thin slop to centrifugal force of at least 4,000 g's, while at a temperature of at least 150° F. thereby producing a liquid phase enriched in finely divided suspended solids, a liquid phase enriched in oil, and a residue of slop from which said oil and said insoluble solids were derived, and separately conducting away said liquid phase enriched in oil, said residue of slop and said liquid phase enriched in suspended solids.

6. Process according to claim 5 in which said slop is heated to at least 150° F. before being subjected to said centrifugal force.

7. Process according to claim 5 which comprises subjecting said thin slop to a centrifugal force of at least 6,000 g's.

MAURICE M. ROSTEN.

REFERENCES CITED

The following references are of record in the file of this patent:

UNITED STATES PATENTS

| Number | Name | Date |
|---|---|---|
| 2,310,184 | Schopmeyer et al. | Feb. 2, 1943 |
| 2,325,327 | Lache | July 27, 1943 |